W. H. White,

Fan.

No. 2788. Reissued Oct. 22. 1867.

Witnesses.
W. L. Bonnern
Wm D Hewlett

Inventor
Wm H. White
by his Atty.
E. S. Renwick

United States Patent Office.

GEORGE MALLORY, OF BRIDGEPORT, CONNECTICUT, ASSIGNEE OF WILLIAM H. WHITE.

*Letters Patent No.* 54,799, *dated May* 15, 1866; *reissue No.* 2,788, *dated October* 22, 1867.

IMPROVEMENT IN FANS AND PARASOLS.

The Schedule referred to in these Letters Patent and making part of the same.

TO ALL WHOM IT MAY CONCERN:

Be it known that I, WILLIAM H. WHITE, of West River, in the county of Anne Arundel, and State of Maryland, have invented certain new and useful Improvements in Fans, Parasols, &c.; and I hereby declare that the following is a full, clear, and exact description of the same, reference being had to the accompanying drawings, in which—

Figure 1 is an elevation, and

Figure 3 a vertical section through the centre of a fan constructed in accordance with my invention.

My improvement relates to that class of fans the surface of which, instead of being capable of development or of being folded, are of a permanent shape, resembling the palm-leaf fan, and has for its particular object economy and expedition in construction, as well as its adaptation to a higher degree of finish and ornamentation than is attainable in fans composed of small leaves, whether detached or folding; also convenience in the use of the same as a sun-shade or canopy, or other like purpose.

My improvements consist of certain combinations of certain of the following instrumentalities, as particularly specified in the claims at the close of this schedule. The said instrumentalities are—

First, a hoop of steel, rattan, or other suitable material capable of holding a covering of cloth strained upon it.

Second, a brace connected with the interior of said hoop, and performing the office of holding it in shape. The form of this brace is not material, as it may be a simple bar, extending diametrically across the hoop, or may be a smaller concentric hoop, connected with the hoop-frame by radial bars, or may be an eccentric hoop, secured at two or more points to the outer hoop.

Third, a handle, by means of which the hoop can be readily held by the hand.

Fourth, a joint connecting the handle with the hoop, such joint enabling the handle to be set in any desired position relatively to the hoop.

Fifth, a fastening for the purpose of holding the handle in the desired position in which it is set.

Sixth, a wrapper or covering, which may be of silk or other suitable material, and is strained upon the hoop. In some of my combinations which are particularly suited to parasols the peculiar construction of this covering is not material, but in the simple combination of a hoop, handle, and wrapper, (with or without the addition of a brace,) constituting a fan with a rigid handle, the construction of the wrapper of a short cylinder drawn in at the end is the essentially novel feature of the combination, a hoop-framed fan with a wrapper or cover of different construction having been made previous to my invention.

To enable others to make and use my said invention, I shall now proceed to describe the methods in which I have carried the same into effect.

Figure 1:
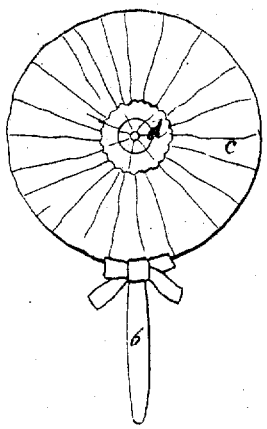
Figure 2:
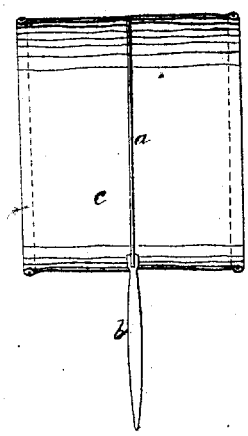
Figure 2 is a sec ional elevation of the same, showing the manner in which the same is constructed.
Figure 3:
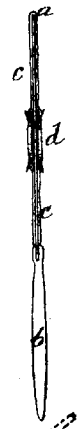
Figure 4:
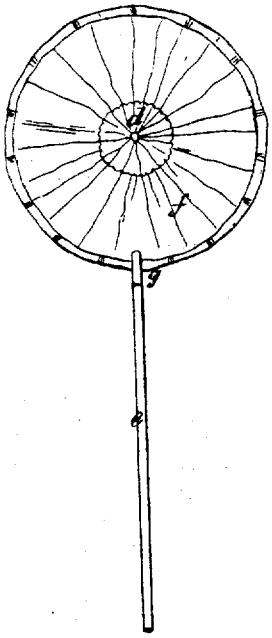
Figures 4 and 5 are respectively front and back views of a combined fan and sun-shade.
Figure 5:
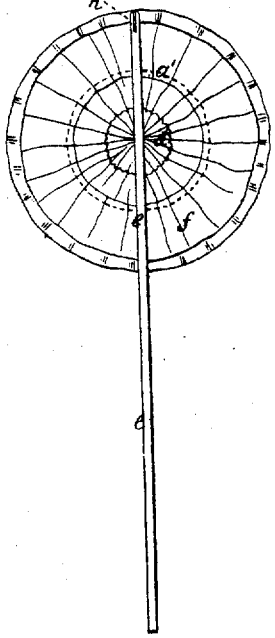
Figure 6:
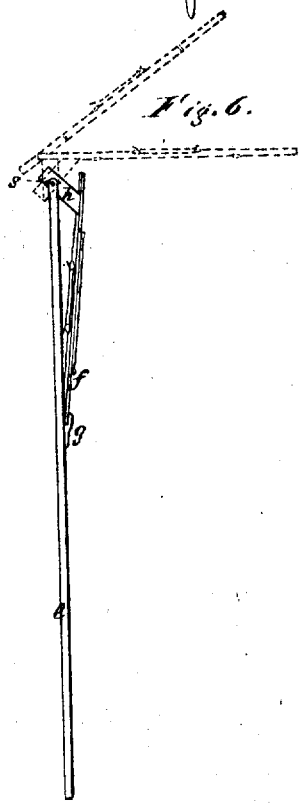
Figure 6 is a side view of the same, exhibiting the manner in which the same may be used.

I first make a circular frame, which may be composed of a hoop of steel, rattan, or other suitable material, and a brace or braces to maintain the hoop in shape, and to allow of the same being rigidly secured to a handle. In some cases the handle may be extended diametrically across the hoop, it thus serving the purpose of a brace, the hoop being secured at two points which are diametrically opposite to the extension of the handle. In some cases I prefer to use two concentric hoops, which are mutually braced by means of corrugated stays or lattice-work; or, again, an inner eccentric hoop may be secured at two or more points tangent to the circular outer hoop. When it is designed to make a fan to be used as such only, then the plan of construction with the handle extending across the hoop may be adopted, it recommending itself for cheapness and simplicity. For fans to be used as a fan as well as a parasol or sun-shade, a self-supporting frame, or one constructed substantially according to one or other of the last two plans, is recommended. I have shown a plain fan in figs. 1, 2, and 3, in which *a* is the hoop, which may be fastened to or set into a handle, *b*. *c* is the wrapper, and *d* a rosette or centre piece. In a combined fan and sun-shade the frame is constructed, as before said, of two or more hoops, or of one hoop suitably braced so as to be self-sustaining; or it may be made of a single hoop, but rigidly connected with an ear, *h*, the object of which will be hereinafter explained. The handle *e* may be of any suitable length; allowance should be made, however, for the attachment of the hoop thereto, which is effected at the upper end by means of an ear and joint. In the present instance the ear *h* is secured to two hoops, of which the frame is composed, (the inner hoop being at the circular lines *a'*, fig. 5.) The ear projects from the face of the fan, and is secured by means of a friction-joint in a slit in the upper end of the handle. I have represented in the drawings the simplest form of joint, which consists of a mere rivet, *s*, clamping the ear *h* in the slit of the handle with sufficient friction so as to hold or maintain the fan in any position it may be placed in relation to the stick or handle. In fig. 6 I have shown three positions of the fan portion, indicated respectively in black, blue, and red colors. To the handle, and at a distance from the ear equal to or somewhat less than the diameter of the fan, is secured a fastening, *g*, the object of which is to lock the fan *f* and maintain it stationary. In lieu of the friction of the joint and the lock fastening, as described, there may be combined with the stick or handle and the fan, a system of leverage somewhat similar to that used in umbrellas or parasols, or other mechanism whereby the fan may be adjusted and held in its various positions to the stick without liability of displacement. When the frame is made I combine with it a wrapper, which may be made of any suitable fibrous or textile material, preferably silk. This is cut in length not more than the diameter of the hoop, having at its ends draw-cases, through which draw-strings are passed. The wrapper is then completed by uniting or sewing the opposite ends together, *i. e.*, at right angles to the draw-cases. When a continuous or cylindrical wrapper is thus formed it is adjusted over the hoop, so as to be divided by the hoop in two equal parts. The ends on either side of the hoop are then drawn together by means of the draw-strings, which gather the material up towards the centre and at each side of the hoop, as shown in figs. 1, 3, 4, and 5. If the wrapper be less than a full diameter of the hoop, it is evident that a central opening will be left, which may be closed by a rosette or by any other ornamental device. In some cases the space may be used for inserting therein a picture or looking-glass.

It is unnecessary to add that a fan so constructed may be ornamented by means of lace-work, or embroidery, or in any other manner, according to the taste of the manufacturer. It is hardly necessary to state how a fan or sun-shade as described may be used, or to what cases it may be applied other than a hand implement. It will, therefore, suffice to say that I contemplate to use this contrivance constructed on a larger scale for buggies or other vehicles as a canopy, which may be held or secured in a suitable socket for the purpose provided.

Having thus described my invention, and the manner in which the same is or may be carried into effect, I claim—

The combination of the following instrumentalities, viz, the hoop, handle, and drawn cylindrical wrapper, substantially as hereinbefore set forth.

Also, the combination of the following instrumentalities, viz, the hoop, brace, and handle, substantially as hereinbefore set forth.

Also, the combination of the following instrumentalities, viz. the hoop, handle, and joint between the handle and hoop, substantially as hereinbefore set forth.

Also, the combination of the following instrumentalities, viz, the hoop, handle, joint, and cover or wrapper, substantially as hereinbefore set forth.

Also, the combination of the following instrumentalities, viz, the hoop, handle, joint, and fastening to hold the handle in its position, substantially as hereinbefore set forth.

Also, the combination of the following instrumentalities, viz, the hoop, handle, joint, fastening, and cover, substantially as hereinbefore set forth.

In testimony whereof I have hereto set my hand this twenty-second day of June, 1867.

WM. H. WHITE.

Witnesses:

FRANCIS IVES,

SAM. B. SUMNER.